United States Patent
Zerbst et al.

(10) Patent No.: US 10,479,253 B2
(45) Date of Patent: Nov. 19, 2019

(54) VEHICLE MOUNTED LOADING AND UNLOADING APPARATUS

(71) Applicants: James E. Zerbst, New Castle, WY (US); Karen Zerbst, New Castle, WY (US)

(72) Inventors: James E. Zerbst, New Castle, WY (US); Karen Zerbst, New Castle, WY (US)

(*) Notice: Subject to any disclaimer, the term of this patent is extended or adjusted under 35 U.S.C. 154(b) by 0 days.

(21) Appl. No.: 16/059,259

(22) Filed: Aug. 9, 2018

(65) Prior Publication Data
US 2019/0135154 A1    May 9, 2019

Related U.S. Application Data

(62) Division of application No. 15/082,491, filed on Mar. 28, 2016, now Pat. No. 10,071,668.

(51) Int. Cl.
| *B60P 1/32* | (2006.01) |
| *B65G 67/24* | (2006.01) |
| *B60P 1/30* | (2006.01) |
| *B60P 1/64* | (2006.01) |

(52) U.S. Cl.
CPC ............... *B60P 1/32* (2013.01); *B60P 1/30* (2013.01); *B60P 1/6463* (2013.01); *B65G 67/24* (2013.01)

(58) Field of Classification Search
CPC .. B60P 1/32; B60P 1/6463; B60P 1/30; B65G 67/24
See application file for complete search history.

(56) References Cited

U.S. PATENT DOCUMENTS

| 1,604,494 | A |   | 10/1926 | Snyder |
| 2,354,337 | A |   | 7/1944  | Smith |
| 2,370,489 | A |   | 2/1945  | Reed |
| 2,708,047 | A |   | 5/1955  | Deidle |
| 3,823,839 | A | * | 7/1974  | Petzing ............... A61G 3/0209 |
|           |   |   |         | 414/462 |
| 4,015,737 | A |   | 4/1977  | Wright et al. |
| 4,015,879 | A |   | 4/1977  | Shonkwiler |
| 5,203,668 | A |   | 4/1993  | Marmur |
| 5,423,650 | A |   | 6/1995  | Zerbst et al. |
| 5,673,831 | A |   | 10/1997 | Spratt |
| 5,690,259 | A |   | 11/1997 | Montani |
| 5,782,391 | A |   | 7/1998  | Cretcher |
| 8,322,580 | B1 |  | 12/2012 | Hamilton |
| 9,896,036 | B2 | * | 2/2018 | Baxter, Jr. ............. B60R 9/042 |

* cited by examiner

*Primary Examiner* — Mark C Hageman
(74) *Attorney, Agent, or Firm* — Bacon & Thomas, PLLC

(57) ABSTRACT

A vehicle mounted loading and unloading apparatus is provided which has a stationary mounting rack removably attachable to a roof of a vehicle and a top rack that includes a container for storing cargo, such as bales of hay. An adjustment mechanism is provided to move the top rack relative to the mounting rack from a transporting position to a loading/unloading position in which the top rack is lowered behind the vehicle to facilitate loading cargo. A movable shelf may be provided on the top rack for assisting with loading and unloading cargo. The shelf is slidable between a rear end of the top rack and a front end of the top rack for placing the cargo.

17 Claims, 8 Drawing Sheets

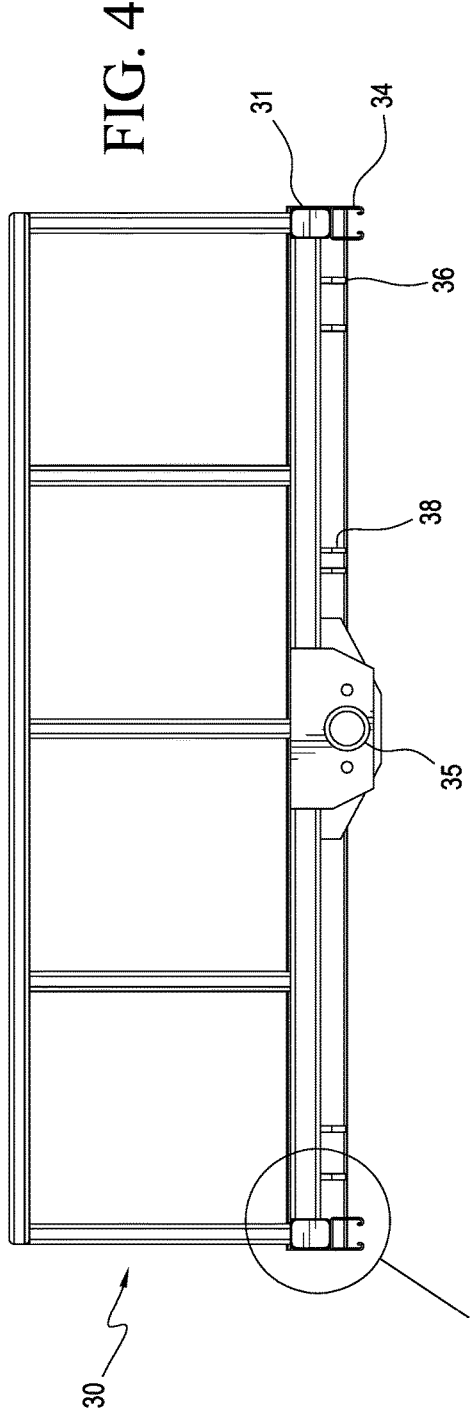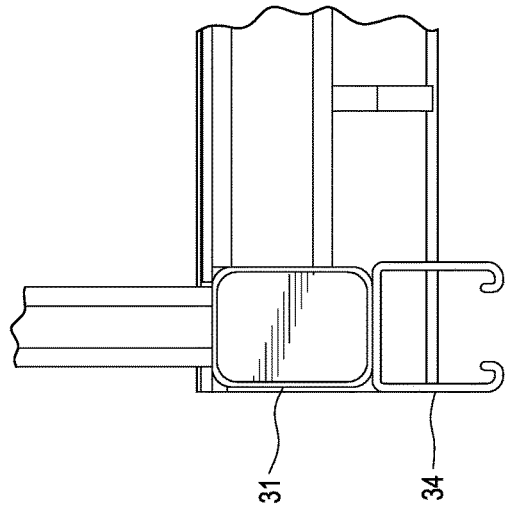

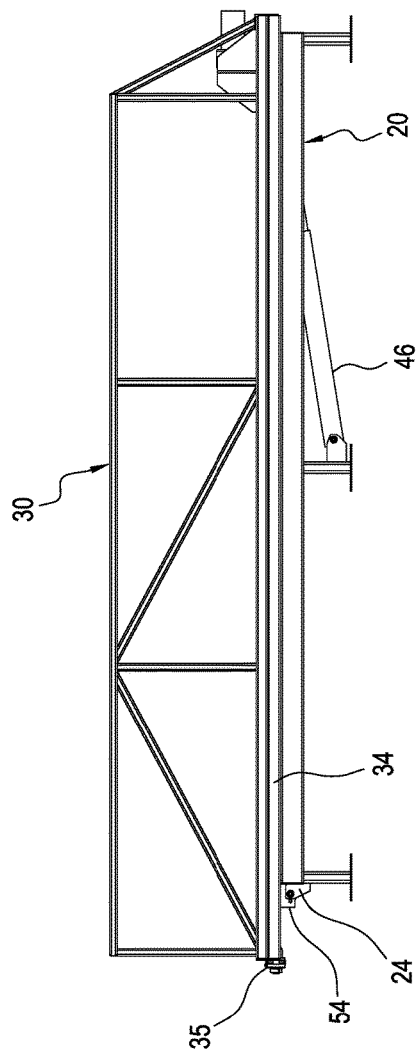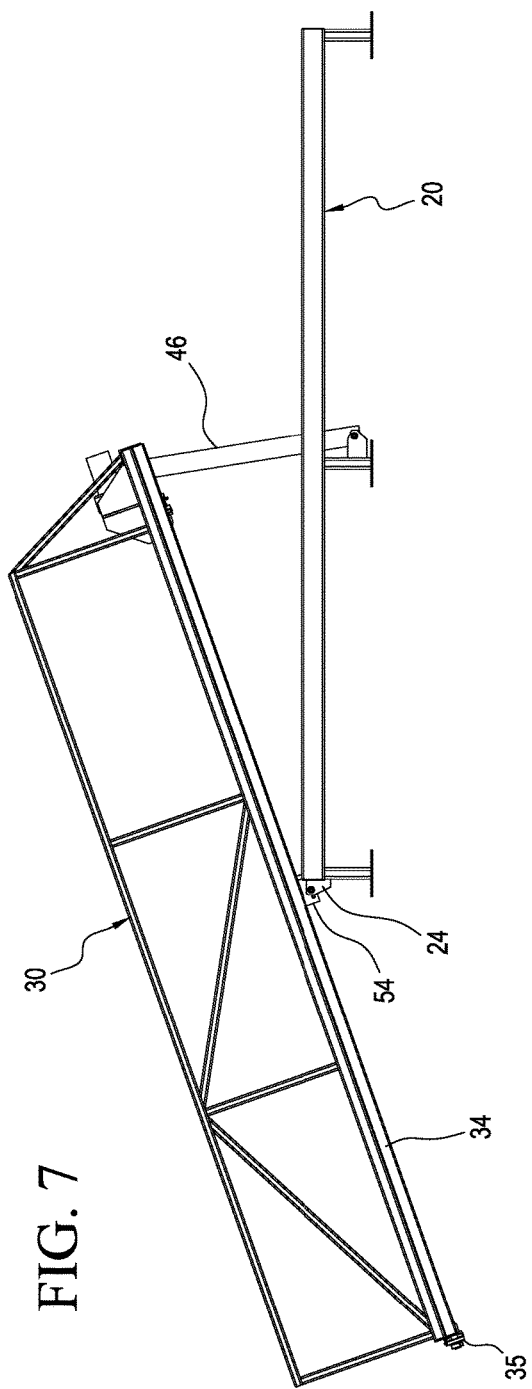
FIG. 6
FIG. 7

US 10,479,253 B2

VEHICLE MOUNTED LOADING AND UNLOADING APPARATUS

This application is a divisional of U.S. patent application Ser. No. 15/082,491, filed Mar. 28, 2016, and now allowed.

FIELD OF THE INVENTION

The present invention relates generally to a vehicle mounted loading and unloading apparatus, and more particularly to a cargo loader configured to load and unload hay and other bulk materials to a vehicle for transporting.

BACKGROUND

Hay is commonly baled for storage and transportation. However, baled hay is quite large and heavy, and thus difficult to handle. To solve this problem, conventional forklift devices are often used to load bales of hay onto the back of agricultural tractors or trucks. However, once these bales of hay are transported to their destination, they must then be unloaded using similar forklift equipment. This process can be very arduous and time consuming since it requires heavy machinery to both load and unload the hay.

It is therefore desirable to equip the transportation vehicle itself with a device that is capable of both loading and unloading large objects like the aforementioned bales of hay, so that use of standalone heavy machinery such as a forklift is not needed. Thus, there is a significant need for a device which makes transporting such large bales of hay easier and faster.

SUMMARY

The present invention relates to a cargo loading and unloading apparatus for a vehicle, such as a bus, truck or trailer. The device facilitates the transportation of cargo and assists a user with loading and unloading the cargo to the vehicle. The device is removably attachable to a roof of the vehicle, and thus the portability of the loading and unloading apparatus facilitates the loading and unloading operation of various sized cargo, such as bales of hay. The vehicle mounted hayrack includes a top rack slidably and pivotally attached to a mounting rack and is driven by a linear actuator having a driving means and an elongated screw rod.

The mounting rack is removably attachable to the roof of a vehicle, such as a trailer. The top rack is configured to load hay and is movably secured to the mounting rack by a pair of telescoping damping members located on opposite sides of the mounting rack. Each telescoping damping member has a first end pivotally connected to the mounting rack, and a second end pivotally connected to the top rack. The driving means may be an electric motor that is provided at a front end of the top rack and activates the turning of the elongated screw rod located between the top rack and the mounting rack.

A threaded collar is pivotally secured to a rear end of the mounting rack and is configured to guide the elongated screw rod as it is turned by the driving device. The elongated screw rod moves through the threaded collar as it is turned by the driving device during operation, such that the top rack correspondingly slides along the mounting rack in a rearward direction. The top rack pivotally separates from the mounting rack as it slides and is supported by the telescoping damping members, which move toward an upright position in a non-extended state to allow the top rack to swing from a horizontal position on top of the vehicle to a slanted position relative to the rear of the vehicle.

The weight of a portion of the top rack overhanging beyond the rear end of the mounting rack causes gravitational forces to rotate the top rack away from the mounting rack, thus swinging the top rack behind the vehicle. The telescoping damping members fully extend during this movement so that the top rack can then be lowered to a loading/unloading position for loading bales of hay. Once the bales of hay are loaded, the driving device is activated to turn the elongated screw rod in the opposite direction in order to retract the top rack to its original transporting position.

A movable shelf unit may also be provided on the top rack for assisting with loading and unloading cargo, the shelf unit having a shelf frame adapted to slide between a rear end of the top rack and a front end of the top rack along a pair of shelf guides provided on each lateral side of top rack for. Rollers provided on opposing lateral sides of the shelf frame roll along the corresponding first and second shelf guides for slidably moving the shelf frame along the top rack. A support bar is attached to the rear end of the top rack by at least one mounting bracket, and at least one pulley is fixed on the support bar for guiding a cable secured to a corresponding hook fixed on the rear end of the shelf frame for selectively pulling the shelf frame toward the rear end of the top rack.

BRIEF DESCRIPTION OF THE DRAWINGS

Various advantages, features and functions of the present invention will become readily apparent and better understood in view of the following description and accompanying drawings. The following description is not intended to limit the scope of the present invention, but instead merely provides exemplary embodiments for ease of understanding.

FIG. 4 is a rear elevation view of the top rack shown in FIG. 3.

FIG. 5 is an enlarged view of a corner portion of the top rack shown in FIG. 4.

FIG. 6 is a side elevation view of the cargo loader according to FIG. 1 in a transporting position.

FIG. 7 is a side elevation view of the cargo loader according to FIG. 1 in an intermediate position.

Figure 1:
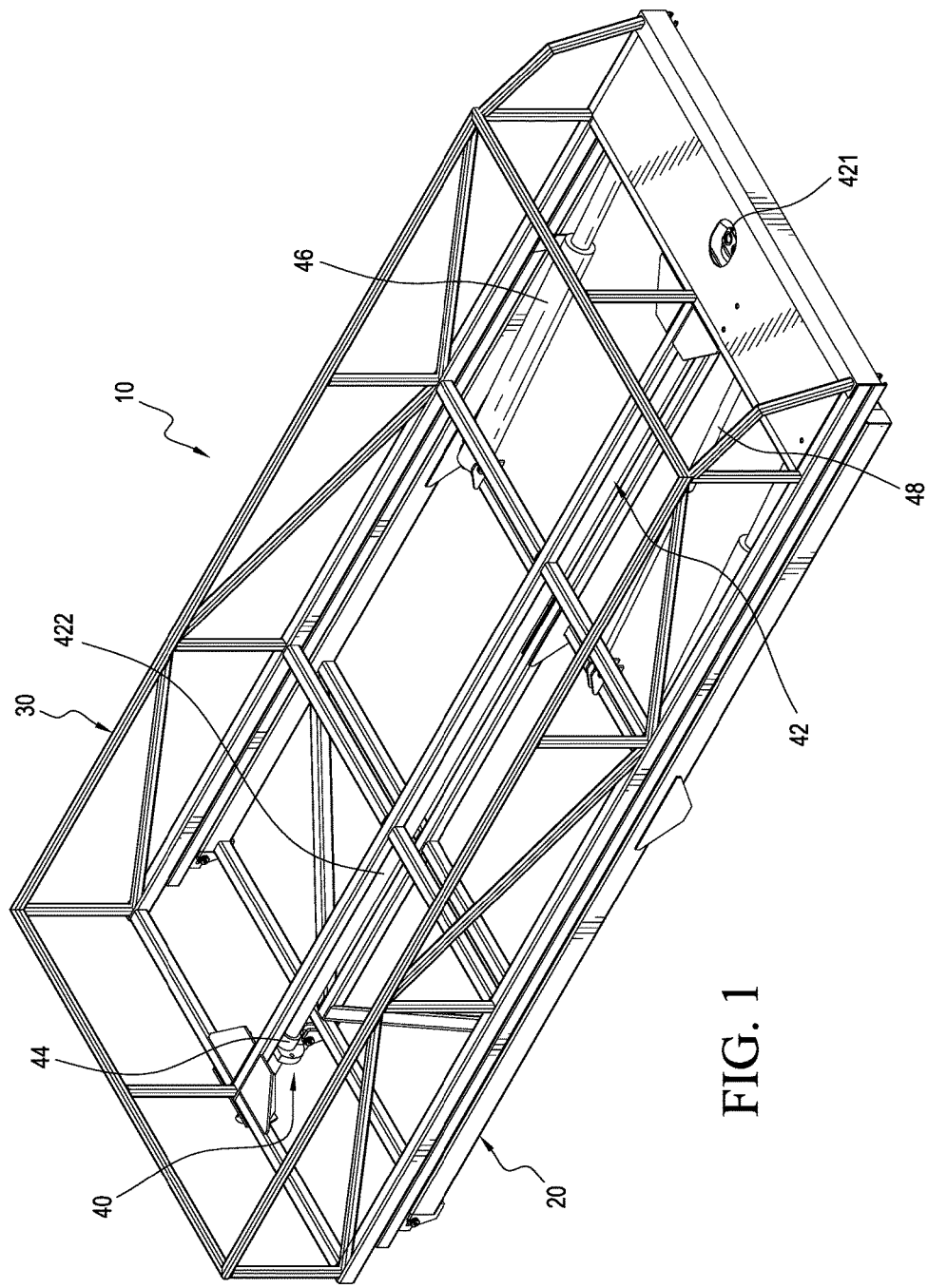
FIG. 1 is a perspective view of a cargo loader according to the present invention.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary configurations of the present invention, and in no way limit the structures or configurations thereof according to the present disclosure.

DETAILED DESCRIPTION

The present invention is directed to a vehicle mounted apparatus for loading and unloading cargo, such as bales of hay and other bulk materials. Referring to FIG. 1, a cargo loader 10 comprises a mounting rack 20 configured to be removably secured to a vehicle, and a top rack 30 configured to be movably connected to the mounting rack. In particular, the top rack 30 is both slidably and pivotally connected to the mounting rack 20. The cargo loader further comprises an adjustment mechanism 40 configured to move the top rack 30 relative to the mounting rack 20 for adjusting the cargo loader between a loading/unloading position and a transporting position.

Figure 2:
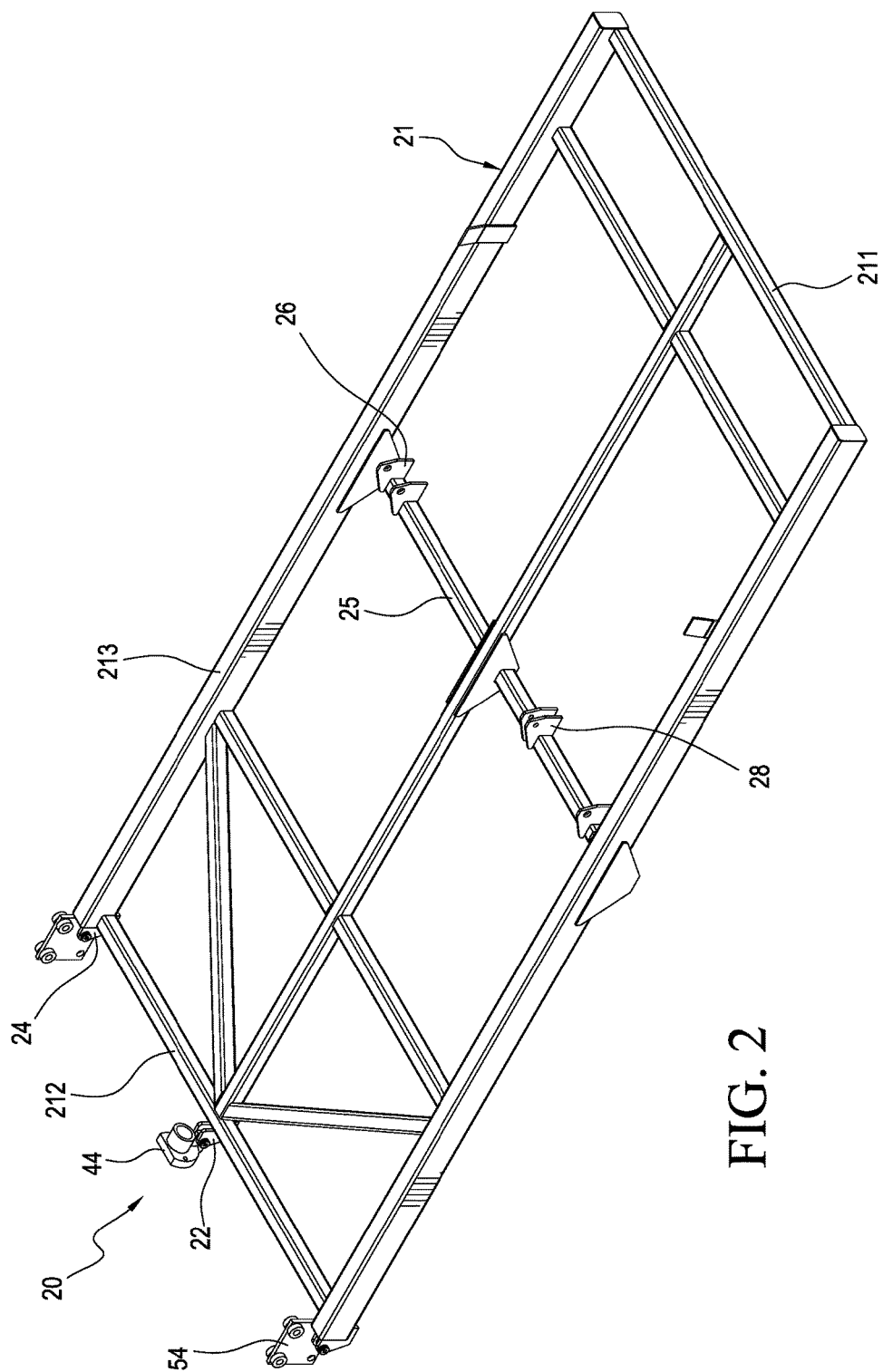
FIG. 2 is a perspective view of a mounting rack of the cargo loader shown in FIG. 1.

With reference to FIG. 2, the mounting rack 20 includes a mounting frame 21 defined by a front mount portion 211, an opposite rear mount portion 212, and two opposing lateral mount portions 213 provided between the front and rear mount portions and arranged parallel to each other. The mounting frame 21 is preferably a rectangular or square shape, and is configured to detachably mount to a vehicle, such as to the roof of a bus or truck. For instance, the mounting frame may be detachably secured to the roof of a vehicle using tie-down strap, clamp or other attachment device.

The mounting frame 21 includes a first pivot ear 22 and a pair of second pivot ears 24, wherein the first pivot ear 22 is centrally located on the rear mounting portion 212 between each of the second pivot ears 24. The mounting frame 21 further includes a support strut 25 located between the front and rear mount portions 211, 212 and having opposing ends respectively connected to the opposing lateral mount portions 213, such that the support strut is arranged parallel to the front and rear mount portions and perpendicular to the lateral mount portions. It should be appreciated that the mounting frame may further include additional struts connected between the various mounting portions of the mounting frame for providing increased structural integrity. The support strut 25 comprises a pair of third pivot ears 26 spaced apart from each other, and a fourth pivot ear 28 located between each of the third pivot ears.

Figure 3:
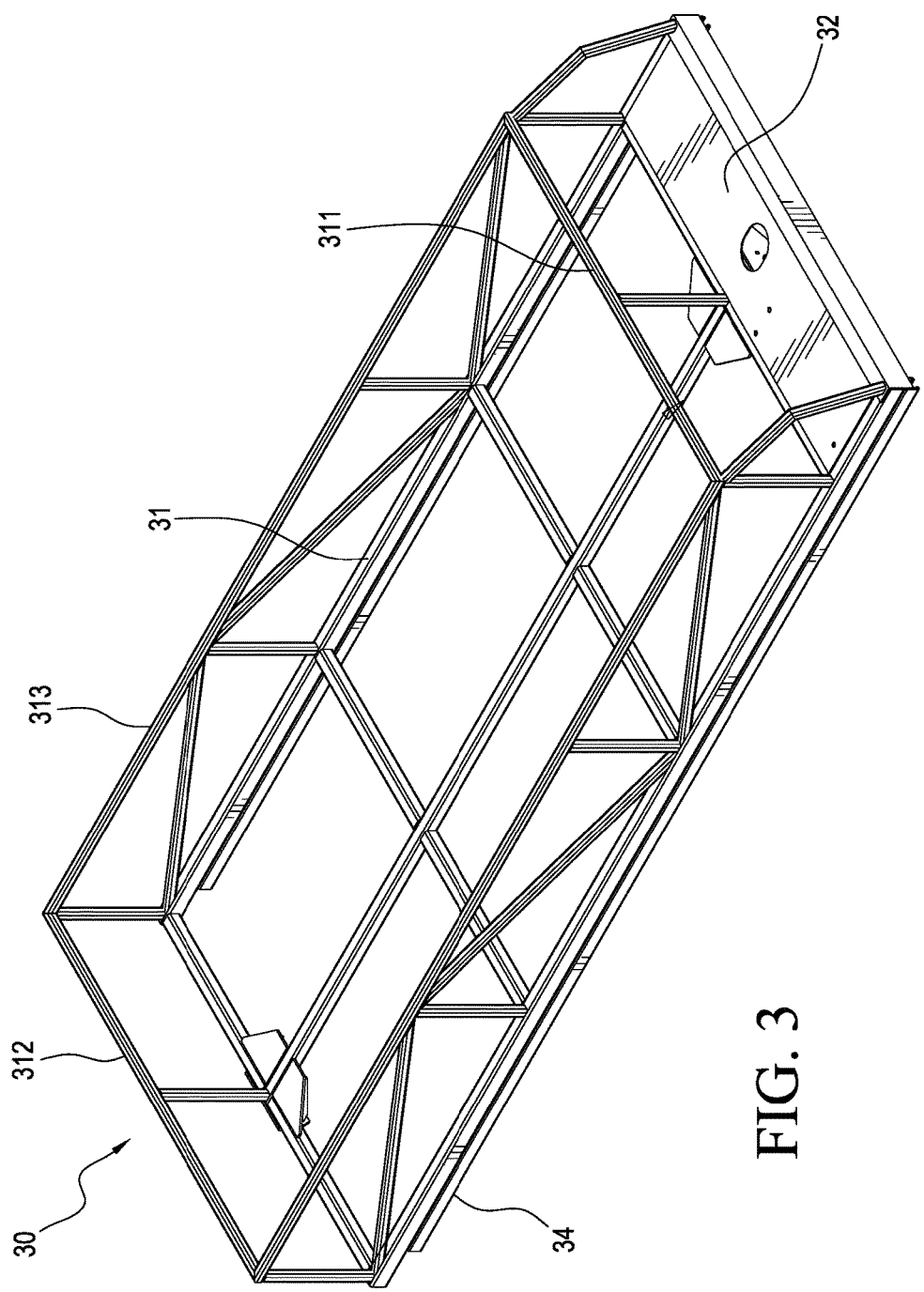
FIG. 3 is a perspective view of a top rack of the cargo loader shown in FIG. 1.

The top rack 30 is configured to receive cargo, such as bales of hay and other bulk materials, and is both slidably and pivotally connected to the mounting rack 20. Referring to FIG. 3, the top rack 30 includes a base frame 31 substantially corresponding to the mounting frame 21 of the mounting rack 20 in both shape and size. Extending in a upward direction from the base frame 21 are a front wall portion 311, an opposite rear wall portion 312, and two opposing lateral wall portions 313 joined to the front and rear wall portions to form a container for storing cargo. A wire mesh or grate may be provided within the base frame and wall portions that form the container so that cargo does not fall out during transport. It should be appreciated that the base frame and wall portions may include a plurality of additional struts and gussets for providing increased structural integrity. The top rack also comprises a mounting shelf 32 located adjacent to the front wall portion 311 on the base frame for housing a driving device. Further, a bottom surface of the front end of the base frame includes a pair of fifth pivot ears 36 spaced apart from each other and corresponding to the respective pair of third pivot ears 26 of the mounting rack, and a sixth pivot ear 38 located between each of the fifth pivot ears and corresponding to the fourth pivot ear 28 of the mounting rack.

The top rack 30 further comprises a pair of longitudinal guide rails 34 respectively provided along the bottom surface of each lateral side of the base frame 31. The pair of guide rails 34 is configured to slidably engage with a corresponding pair of trolleys 54 pivotally connected to the respective second pivot ears 24 of the mounting frame 21, such that top rack is both slidable and pivotable with respect to the mounting rack. Each trolley 54 includes a plate member 541 configured to pivotally engage with the respective second pivot ear 24, and at least one roller or wheel 542 configured to slidably engage an interior channel of the guide rail 34. In particular, the guide rails 34 define a substantially U-shaped cross-section having at least one inwardly extending, hook-shaped, flange for supporting the corresponding roller.

As illustrated in FIGS. 4 and 5, each guide rail 34 is mounted to the underside of the base frame 31 and includes an elongated opening defining a channel adapted to slidably receive the respective trolley 54. In particular, the longitudinal opening of the guide rail 34 includes at least one inwardly extending longitudinal flange for engaging the rollers 542 of the trolley.

The adjustment mechanism 40 is provided between the top rack and the mounting rack, and comprises a linear actuator 42, a threaded pivot collar 44, and at least one damping member 46. The linear actuator comprises a driving device 421, such as an electric motor, and an elongated threaded screw rod 422 having a first end and an opposite second end. The first end of the screw rod 422 is rotatably connected to the driving device and the second end of the screw rod is rotatably connected to a support collar 35, such as a bearing member, mounted to the bottom surface of the rear end of the top rack. The screw rod 422 is provided below the top rack and has a length extending from the driving device to the support collar. The threaded pivot collar 44 is pivotally connected to the first pivot ear 22 of the mounting rack and is configured to correspondingly engage the threaded screw rod between the first and second ends thereof. The driving device may be attached to either a top surface or a bottom surface of the mounting shelf 32, and is adapted to rotate the screw rod 422.

The at least one damping member 46 is configured to provide damping between the top rack and the mounting rack as the cargo loader extends from a transporting position to a loading/unloading position, and back from the loading/unloading position to the transporting position. The at least one damping member 46 is preferably a hydraulic damping member having a telescoping sliding shaft. As shown in FIG. 1, a pair of damping members 46 respectively connect the top rack to the mounting rack. In particular, a first end of each damping member 46 is pivotally connected to a respective third pivot ear 26 of the mounting rack, and a second end of each damping member is pivotally connected to a respective fifth pivot ear 36 of the top rack. Further, an auxiliary damping member 48 may provide additional damping, wherein a first end of the auxiliary damping member is pivotally connected to the fourth pivot ear 28 of the mounting rack, and a second end of the auxiliary damping member is pivotally connected to the sixth pivot ear 38 of the top rack.

Figure 8:
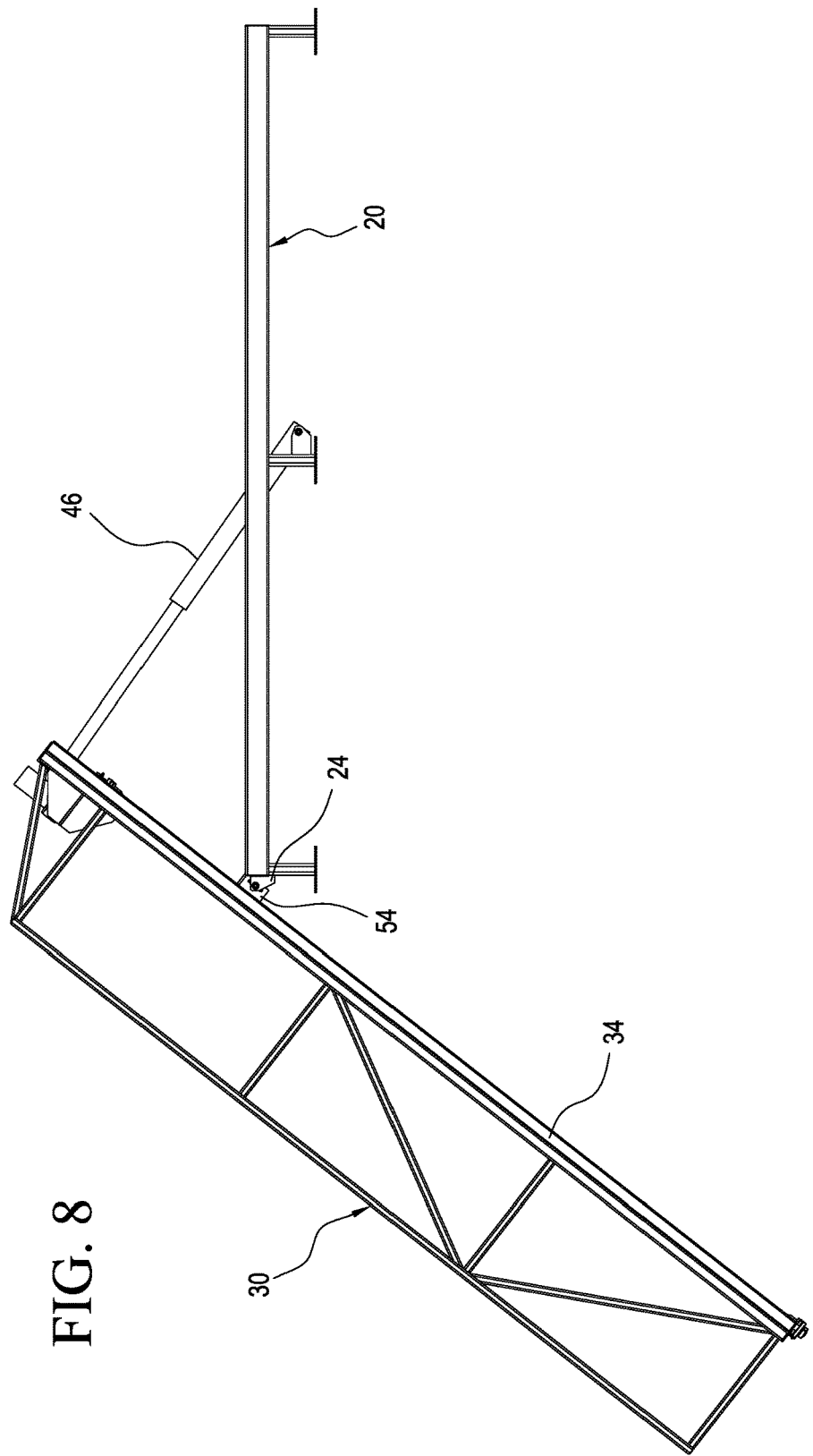
FIG. 8 is a side elevation view of the cargo loader according to FIG. 1 in a loading/unloading position.

The cargo loader may be adjusted from a transporting position as shown in FIG. 6 to a loading/unloading position as shown in FIG. 8. In operation, the driving device 421 turns the elongated screw rod 422 in a first rotating direction. The pivot collar 44 is pivotally connected to the first pivot ear 22 on the rear end of the mounting rack and is configured to guide the elongated screw rod. The pivot collar 44 threadedly engages the screw rod such that as the driving device turns the screw rod, it moves through pivot collar and causes the top rack to correspondingly slide along the stationary mounting rack in the rearward direction. In particular, each trolley 54 is pivotally connected to a respective second pivot ear 24 of the mounting rack and slidably engages the guide rail 34 of the top rack. As the top rack moves toward an intermediate adjustment position, as shown in FIG. 7, the top rack pivots away from the mounting rack toward the loading/unloading position.

To counter the weight of the top rack, the damping members 46 provide damping support as the top rack extends beyond the rear end of the mounting rack and pivots away from the mounting rack. This causes the telescoping rods of the damping members 46 fully extend so that the top rack can then be lowered to a final loading/unloading position for loading bales of hay and other bulk objects as shown in FIG. 8. Once the top rack is loaded, the driving device turns the screw rod in a second opposite rotating direction in order to retract the top rack back to its original transporting position.

Figure 9:
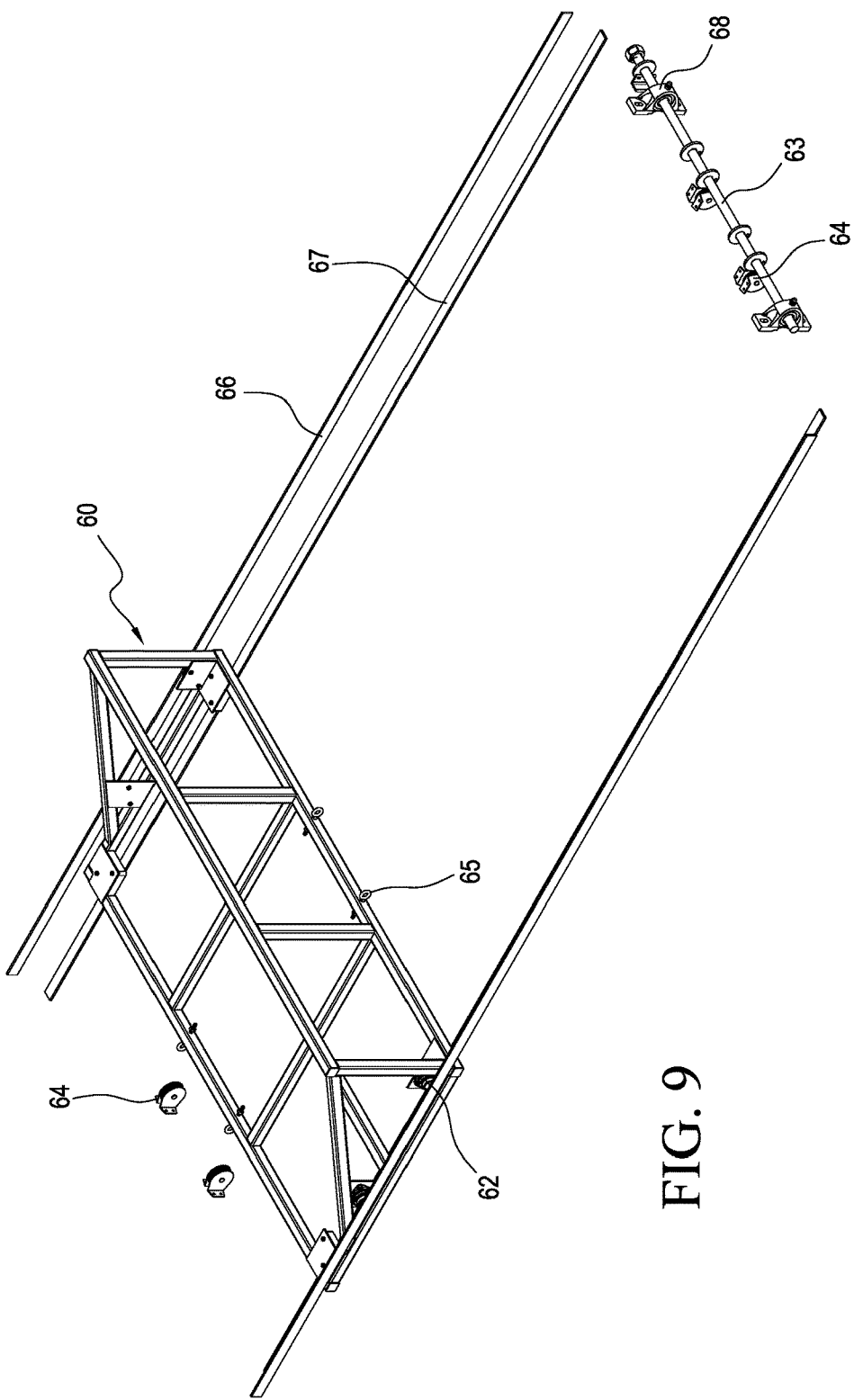
FIG. 9 is an exploded perspective view of a shelf unit for the cargo loader according to the present invention.

In a variation of the cargo loader of the present invention, the top rack further comprises a shelf unit 60 which assists with loading and unloading cargo as shown in FIG. 9. The shelf unit 60 includes a movable shelf frame configured to slide between the rear end of the top rack and the front end of the top rack. The base frame 31 of the top rack includes a first shelf guide 66 and a second shelf guide 67 provided on each lateral side of top rack for guiding the slidable shelf frame. A set of rollers 62 are provided on opposing lateral sides of the shelf frame and are arranged to roll along the corresponding first and second shelf guides for slidably moving the shelf frame along the top rack.

A support bar 63 is attached to the rear end of the top rack by at least one mounting bracket 68. At least one pulley 64 is fixed on the support bar and includes a cable engaged to a corresponding hook 65 fixed on the rear end of the shelf frame for selectively pulling the shelf frame toward the rear end of the top rack. The at least one pulley may also be fixed to the front end of the top rack and includes a cable engaged to a corresponding hook fixed on the front end of the shelf frame for selectively pulling the shelf frame toward the front end of the top rack.

Figure 10:
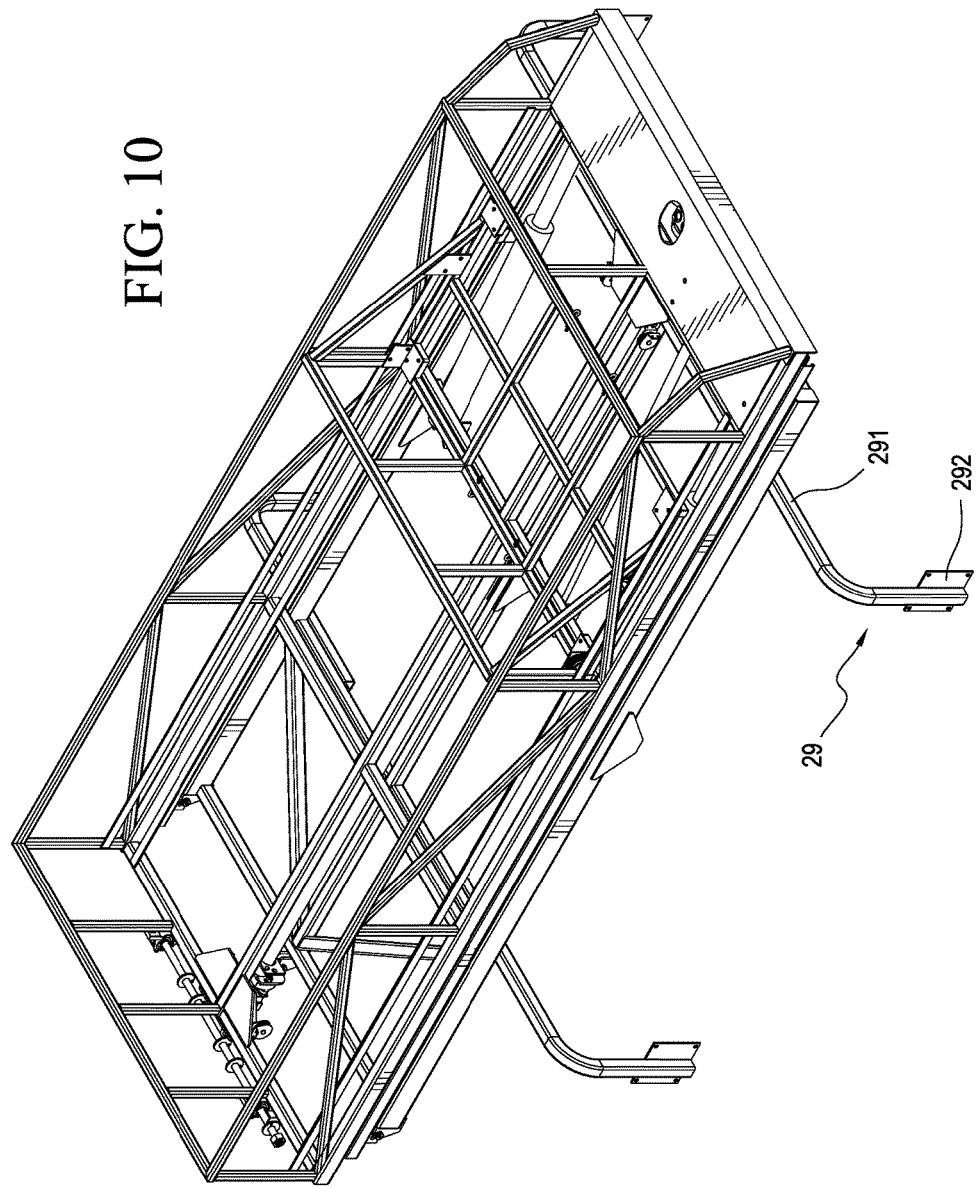
FIG. 10 is a perspective view of a cargo loader having the shelf unit shown in FIG. 9.

A variation of the mounting frame may further include a plurality of attachment members 29 as shown in FIG. 10. Each attachment member 29 includes a first attachment portion 291 attached to the mounting frame and a second attachment portion 292 configured to attach to a vehicle, such as the side of a bus or truck. In particular, the first attachment portion is substantially perpendicularly connected to the second attachment portion by a curved elbow portion. Thus, the first attachment portion is configured to extend laterally across the top of the vehicle, and the second attachment portion is configured to extend downward along the side of the vehicle. The second attachment portion further includes an engaging member configured to directly secure to a vehicle. The engaging member may be a plate having a plurality of bolt insertion holes for bolting the engaging member directly to a side of the vehicle, thus securing the entire cargo loader to the roof of the vehicle.

Various other modifications and changes will be apparent to those of ordinary skill in the art without departing from the spirit and scope of the present invention. Applicant intends that these variations and modifications are included as part of the present invention and are not intended to limit the scope of the invention. Applicant does not intend the present application to be limited to only those embodiments outlined above or shown in the figures since features shown in particular embodiments may be incorporated into other embodiments. The present application is intended to cover such alternatives, modifications, and equivalents as may be included within the spirit and scope of the invention as defined by the appended claims.

We claim:

1. A loading and unloading apparatus comprising:
a mounting rack configured to removably attach to a roof of a vehicle, and including a mounting frame defining a first plane and having a front mount portion, a rear mount portion, and a pair of opposing lateral mount portions;
a top rack slidably and pivotally connected to the mounting rack, and including a base frame defining a second plane and having a front wall at a front end of the top rack, a rear wall at a rear end of the top rack, and a pair of opposing lateral wall portions defining a container space for storing cargo;
an adjustment mechanism adapted to slidably and pivotally move the top rack relative to the mounting rack from a transporting position in which the respective first and second planes of the mounting frame and the base frame are substantially parallel, to a loading/unloading position in which the second plane of the base frame is slanted and lowered with respect to the first plane of the mounting frame; and
a movable shelf unit provided on the top rack for assisting with loading and unloading cargo, the shelf unit including a shelf frame adapted to slide between a position adjacent the rear end of the top rack and a position adjacent the front end of the top rack, wherein the movable shelf unit maintains a predetermined fixed orientation relative to the top rack as the movable shelf unit slides between the position adjacent the rear end of the top rack and the position adjacent the front end of the top rack.

2. The loading and unloading apparatus according to claim 1, wherein the base frame of the top rack includes a first shelf guide and a second shelf guide provided on each lateral side of top rack for guiding the slidable shelf frame.

3. The loading and unloading apparatus according to claim 2, further comprising a set of rollers provided on opposing lateral sides of the shelf frame adapted to roll along the corresponding first and second shelf guides for slidably moving the shelf frame along the top rack.

4. The loading and unloading apparatus according to claim 3 further comprising a support bar attached to the rear end of the top rack by at least one mounting bracket, and at least one pulley fixed on the support bar for guiding a cable secured to a corresponding hook fixed on the rear end of the shelf frame for selectively pulling the shelf frame toward the rear end of the top rack.

5. The loading and unloading apparatus according to claim 1, wherein the adjustment mechanism comprises a linear actuator, and the linear actuator comprises a driving device and an elongated threaded screw rod threadedly engaged to a threaded pivot collar and having a first end and an opposite second end, wherein the first end of the screw rod is rotatably connected to the driving device and the second end of the screw rod is rotatably connected to a support collar mounted to the rear end of the top rack.

6. The loading and unloading apparatus according to claim 5, wherein the driving device is adapted to rotate the screw rod, and wherein the screw rod is located between the top rack and the mounting rack and has a length extending from the driving device to the support collar.

7. The loading and unloading apparatus according to claim 5, wherein the support collar is a bearing member.

8. The loading and unloading apparatus according to claim 5, wherein the top rack further includes a mounting shelf adjacent to the front wall portion on the base frame and configured to house the driving device.

9. The loading and unloading apparatus according to claim 5, wherein the driving device is an electric motor.

10. The loading and unloading apparatus according to claim 1, wherein the adjustment mechanism comprises a linear actuator, a threaded pivot collar pivotally connected to the mounting rack, and a pair of damping members having a first end pivotally connected to the top rack and a second end pivotally connected to the mounting frame.

11. The loading and unloading apparatus according to claim 10, wherein the linear actuator comprises a driving device and an elongated threaded screw rod threadedly engaged to the threaded pivot collar and having a first end and an opposite second end, wherein the first end of the screw rod is rotatably connected to the driving device and the second end of the screw rod is rotatably connected to a support collar mounted to the rear end of the top rack.

12. The loading and unloading apparatus according to claim 11, further comprising a pair of trolleys pivotally connected to the mounting frame and each including a plate member and at least one roller.

13. The loading and unloading apparatus according to claim 12, wherein the top rack further comprises a pair longitudinal guide rails configured to engage the respective pair of trolleys, wherein the each of the pair of guide rails is oppositely spaced apart on lateral sides of the base frame.

14. The loading and unloading apparatus according to claim 13, wherein the pair of guide rails include a longitudinal opening having at least one inwardly extending flange configured to receive the at least one roller of the respective pair of trolleys.

15. The loading and unloading apparatus according to claim 11, wherein the driving device is adapted to rotate the screw rod, and wherein the screw rod is located between the top rack and the mounting rack and has a length extending from the driving device to the support collar.

16. The loading and unloading apparatus according to claim 11, wherein the driving device is an electric motor.

17. The loading and unloading apparatus according to claim 1, wherein the mounting frame further includes a support strut located between the front and rear mount portions and having opposing ends respectively connected to the opposing lateral mount portions, such that the support strut is arranged parallel to the front and rear mount portions and perpendicular to the lateral mount portions.

* * * * *